United States Patent [19]

Gardner-Carimi et al.

[11] Patent Number: 4,780,327

[45] Date of Patent: Oct. 25, 1988

[54] METHOD OF PRODUCING COOKED MEAT PRODUCT SUITABLE FOR SHREDDING

[75] Inventors: Alayne S. Gardner-Carimi; Donna J. Rentschler, both of Madison; Teresa A. Raap, Deerfield, all of Wis.

[73] Assignee: Oscar Mayer Foods Corporation, Madison, Wis.

[21] Appl. No.: 914,396

[22] Filed: Oct. 2, 1986

[51] Int. Cl.$^4$ .................................................. A23L 1/31
[52] U.S. Cl. .................................... 426/281; 426/412; 426/641
[58] Field of Search ................ 426/281, 412, 410, 641

[56] References Cited

U.S. PATENT DOCUMENTS 3,961,090 6/1976 Weiner et al. ....................... 426/281
3,971,854 7/1976 Hinnergardt ........................ 426/281

*Primary Examiner*—George Yeung
*Attorney, Agent, or Firm*—Joseph T. Harcarik; Thomas R. Savoie; Daniel J. Donovan

[57] ABSTRACT

A cooked meat product suitable for shredding and a method for preparing such. Meat is denuded of external fat and connective tissue and injected with a water and salt solution. The meat is then diced and added to a cooking pouch containing pre-mixed liquid-state fat, spices/seasonings and starch. The product is cooked in a water tank via a step process reaching a final product temperature of approximately 200° F. at which point the product may be shredded prior to chilling and storage at 40° F.

19 Claims, No Drawings

METHOD OF PRODUCING COOKED MEAT PRODUCT SUITABLE FOR SHREDDING

BACKGROUND OF THE INVENTION

1. Field of the Invention

This invention relates to a cooked meat product suitable for shredding and a procedure for its manufacture more particularly this invention relates to a cooked meat product that is processed within "cook-in" packaging material to produce a product that can be shredded while still in the packaging material and exhibits an extended shelf life.

2. Description of the Prior Art

It has long been known that if one were to cook a piece of meat for a sufficiently long period of time or under pressure eventually the meat would fall apart into the individual muscle fibers or groups of fibers. This phenomenon has been recognized and used for such products as stews, pot roasts, soups and briskets. Recently, it has become desirable to use shredded meat or shredded meat products in various ways in the food industry. The fast food industry in particular has developed a need for producing or having a supplier produce a shredded meat or meat suitable for shredding. Prior to this invention, that would mean an expenditure of large amounts of manpower and energy to the fast food producer, as shredded meat or meat that was readily shreddable was not commercially available.

The best method to date for supplying a shredded meat or a shreddable meat was to cook the meat in a pressure vessel and then mix the meat in an open vessel with a roux or sauce or flavoring gravy of some sort. Then this combination would be put into a bag and sealed, at which time the bag would have to be pasturized after the meat had been processed to allow for refrigerated storage.

Returning now from the manner in which meat can be processed to the subject of shredding. We should first look at the meat itself. In the book *The Science of Meat and Meat Products* published in 1971 written by R. Cassens, at pp. 18 and 19, we find the description of connective tissue. Connective tissue is one of the main factors and components of animal tissue. The connective tissue, as used herein, is that which divides the muscle into bundles and the connective tissue component that is most common in the muscle tissue is collagen. Muscle cells do not occur in the absence of connective tissue and the collagen can be converted to gelatin through a process called hydrolysis. Hydrolysis of collagen occurs in the presence of water and heat.

Ledward et al. in the *J. Sci. Food Agric.*, Volume 35, 1984, at page 1–62, states that hydrolysis of collagen is relatively slow until the temperature reaches about 90° C. or about 194° F. with a marked increase in the rate of hydrolysis of the collagen from 90° C. to 100° C. (194° F. to 212° F.).

There are several problems that arise when dealing with or producing the shreddable meat product using the methods previously known. One important problem is the reduction or the limitation of shelf life due to the post pasturization process which is really not very efficient. Yield losses may also be high, as well as the loss of significant flavors and aromas during the cooking and mixing process prior to packaging. However, one of the most difficult problems to overcome has been in the area of developing product processing parameters and the related problem of package failures during any heat treatment (i.e., pasturization) steps.

SUMMARY OF THE INVENTION

The present product and method of preparation for making an improved cooked meat product suitable for shredding make this invention unique. A (cook-in) package and a rigorous cooking process impart a permeating savory aroma and flavor to the meat and meat sauce. This process also creates meat pieces with unique shredding characteristics. The meat pieces are a result of first removing the fat and heavy connective tissue (commonly known as gristle) from the meat then later adding fat, in a liquid state, to the meat.

It has been found that the fat inhibits the protein binding of the surface proteins between cubes or pieces of meat and, therefore, interferes with the clumping or binding of the meat pieces. The method of preparation utilizes the shredding ability of meat containing hydrolyzed connective tissue and allows intermingling of sauce and the meat fibers.

The method of preparing an improved cooked meat product suitable for shredding comprises the steps of removing significantly all fat and gristle from the outside of the meat to be prepared; injecting said meat with a solution comprising water and salt, wherein the amount of the solution is at least about 5 weight percent to about 18 weight percent based on the weight of the meat; using sufficient means to distribute the solution within the meat; forming a roux that comprises a liquid-state fat, selected from the group consisting of animal and vegetable fats, and seasonings; packaging the meat and the roux in hermetically sealed packaging material, wherein the packaging material is sufficient to withstand the thermal processing parameters that follow; processing the packaged meat at temperatures sufficient to cause hydrolysis of a significant amount of the connective tissue and render the meat suitable for shredding, including an initial packaging material thermal-shock tempering step or steps, if the packaging material so requires. This is followed by chilling of the packaged meat until use.

Accordingly, an object of the invention is to provide a cooking process which allows for hydrolysis of collagen and subsequent ease of shredding of the muscle fibers.

Another object is to provide a product with a savory meat aroma and flavor.

Another object is to provide a permeating, well rounded spice flavor system.

Still another object of the invention is to provide a method of preparation which allows the fat, contained in a roux to coat the meat fibers.

Still another object is to produce a product of reduced yield (moisture) loss when heating in a (cook-in bag) method vs. stock pot reconstitution.

Still another object is to provide a product with an extended refrigerated shelf life in comparison to previous refrigerated meat products.

These and other objects, features and advantages of the invention will be apparent from the specification which follows.

DETAILED DESCRIPTION OF THE INVENTION

The method and product of the present invention require the use of a boneless piece of meat. The meat can be any of the animal tissues such as beef, pork or poultry. It is to be understood that the processing parameters of the invention are dependent upon the type of meat used. Additionally, another variable is the size of the piece or pieces of meat that are to be packaged and processed. Along this vein, in the discussion to follow the meat used, for illustrative purposes only, will begin as a boneless cut of beef, in the 7 to 10 pound range and will later be diced to reduce the processing times. The type of meat, weights, cube sizes and descriptors are used only for ease of discussion and are not to be construed as limiting of the invention.

The meat to be processed is trimmed of as much fat and gristle as possible. If not properly denuded, the external fat and gristle will remain, after processing, as discrete chunks and pieces and detract from the utility of the finished product without contributing, any beneficial attributes.

After trimming the meat is then injected with a solution that comprises water and salt. More preferably the solution further comprises a triphosphate. The preferred triphosphate is sodium tripolyphosphate. The salt is present for taste and flavor; while the triphosphate is present to bind the water in the finished product. The inventors also envision that other ingredients may be present in this solution. The meat is, therefore, to be injected until from about 5 to about 18 weight percent (based on said meat) of the solution is held within the piece of meat. The preferred range is from about 10 to about 12 percent.

After the injection with the solution the meat is subjected to a means of distributing the injected solution throughout the piece of meat. One such means is a tumbler, in which the meat is placed within the equipment and subjected to constant forces such as a vacuum, meat to meat and meat to surface impacts, and is rolled and tumbled to distribute the injected solution. In the case of a 7 to 10 pound piece of beef the distribution of the injected solution is sufficient after approximately 1.5 hours in a tumbler.

Next, the meat is diced, if desired, into cubes or slices. This step will reduce the overall energy and time necessary to performed the required processes.

Next, the meat, either diced or whole, is placed into packaging material along with a roux, sauce or gravy and heat sealed, under vacuum. Turning first to the roux, this ingredient is very important. The roux serves several purposes. Flavor and aroma of the finished product being one. The "cook-in" packaging traps the volatiles and causes the flavors within to permeate the meat. Secondly, the roux is the source of the fat that coats the pieces of the meat to prevent protein-protein binding between the cubes of beef. Such binding together of two or more pieces of meat prohibits the proper processing of the meat. The roux comprises a fat in the liquid state (preferably the fat removed during the denuding step and then rendered), and seasonings. The liquid-state fat, which may first have to be melted, is combined with the flavor ingredients. If so desired, the roux may further comprise a starch. The amount of fat present in the roux is from about 3 to about 5 weight percent and in the finished product is from about 2.5 to about 4.5 percent. Secondly, the package material, commonly refered to as cook-in or cook-in-the-bag packaging is well known in the art. The material must be able to withstand the processing parameters of the invention. Such materials must have heat seal and oxygen barrier characteristics. One, such example is the retort pouch and another is Curwood® Curlon®611 pouch material. The prefered film bag, at present, comprises 1.5 mils of nylon with 3 mils of a linear low density polyethene. The packaged beef is then subjected to processes that hydrolyze the connective tissue (collagen) of the meat. Using materials available to date, these processes should, preferably, be performed in three steps.

The liquid-state fat, which can be selected from the group consisting of animal and vegetable fats will function in single or multi step processes. The initial step performed at from about 140° F. to about 160° F. and preferably from about 145° F. to about 155° F. tempers the packaging material for thermal-shock; while the second processing step, performed at from about 170° F. to about 190° F. and preferably from about 175° F. to about 185° F. both begins the hydrolysis of the connective tissue and tempers or treats the packaging material a second time. The final or hydrolysis step is performed at from about 190° F. to about 212° F. with the preferred range being from about 195° F. to about 205° F.

After the connective tissue has been hydrolyzed sufficiently to render the meat shreddable, the meat may then be subjected to forces that will shred the meat (this step may be performed at a later time, if desired). One such source of said forces is by manual manipulation of the packed meat. The fingers squeeze and mash the packaged meat until the muscle fibers separate from one another and the desired result is achieved. These fiber separating forces may also be applied by mechanical means. The temperature at which such forces are to be applied is from about 150° F. to about 200° F. and preferably from about 160° F. to about 190° F.

If the shredding step is to be performed at a later date than at the time of processing the packaged meat than the meat will thereafter have to be reheated to temperature of from about 160° F. to about 190° F. It has been found that below that range an unacceptable amount of muscle fiber breakage occurrs during the shredding process. If this muscle fiber breakage is also desirable then the determining factor will be the ease with which the meat is to be shredded and broken up and that temperature is easily determinable by minimal experimentation. The final and last processing step, therefore, is the chilling of the package shredded beef and it has been found, as with most meat products, that 32° F. to 40° F. is a preferable storage temperature.

The packaged meat product of the present invention has been found to exhibit a shelf life when stored at 40° F. of at least 120 days. The previously known methods of processing the meats in a pressure vessel and then mixing in an open vessel with a roux and thereafter packaging produces a post-pasturized product that exhibits a shelf life of only 90 days or less.

It will be understood that the embodiments of the present invention which have been described and which are enumerated in the example following are illustrative of some of the applications of the principles of the present invention. Numerous modifications may be made by those skilled in the art without departing from the true spirit and scope of this invention.

EXAMPLE

The following ingredients are used in this example.

| Ingredients | Weight In Pounds | Percent |
| --- | --- | --- |
| Beef | 100.0 | 84.0 |
| Water | 10.9 | 9.1 |

-continued

| | | |
|---|---|---|
| Salt | 0.6 | 0.5 |
| Sodium Tripolyphosphate | 0.5 | 0.4 |
| Rendered Beef Fat | 3.5 | 2.9 |
| Seasonings & Starch | 3.7 | 3.1 |
| | 119.2 | 100.0 |

Preparation

A. Roux Procedure
 1. Melt rendered fat in a steam jacketed kettle.
 2. Transfer fat to a Hobart ®-type mixing bowl.
 3. Using the wire wisk beater, mix in seasonings and starch with the Hobart ® mixer or by hand.
 4. Place roux into filler hopper.
 5. Adjust filler to dispense approximately 0.18 to 0.20 pounds of beef roux into each 3 pound pouch.
 6. Best temperature for dispensing the roux is from about 120° F. to 200° F., no more than 200° F.

B. Meat
 1. Remove as much fat and gristle from the outside of a seven to ten pound piece of boneless beef.
 2. Assemble meat to run through an injector.

C. Injector and Tumbling Procedure
 1. Formula
   a. pumping solution:

| | Percent |
   |---|---|
   | water | 90.8 |
   | salt | 5.4 |
   | sodium tripolyphosphate | 4.2 |
   | | 100.0 |

2. Solution Forming Procedure - prepare pump solution by dissolving the sodium phosphate in the water. Next add salt and mix for sufficient amount of time to thoroughly dissolve.
 3. Transfer the pumping solution into the supply tank of the injector equipment. Make sure all filters are in place and that both the supply and return lines are in the proper places on the equipment. The injector should be adjusted so that from about 10 to 12% by weight of solution is added to the meat.
 4. The injected meat should then be transferred to tumbling tanks and tumbled under vacuum (approximately 28 inches Hg.) and the meat processed for 90 minutes.
 5. Next, the meat is diced into cubes that are approximately 2 × 1½ × 1½ inches. The diced meat should not stand for more than 1 hour due to the presence of the injected solution.
 6. Fill a hopper with the beef cubes and dispense the meat so that 2.75 pounds to 2.88 pounds of meat is delivered to the pouches containing the roux. (The total weight of the packaged meat will be determined upon the size of the packaging material pouch.)
 7. Use a Multivac ® machine to evacuate and hermetically seal the pouches.
 8. After packaging and vacuum sealing, the packaged beef is then placed on cook racks and immersed in the processing water which is agitated for constant temperature evenness throughout all locations of the processing tank.
 9. The packaged meat is then processed for one hour at a temperature of approximately 150° F. or until internal meat temperature is about 150° F.
 10. The packaged meat is then placed in a processing tank containing water of 180° F. and processed for another hour or until internal meat temperature is about 180° F.
 11. Finally the packaged meat is placed in a final processing tank containing 200° F. water and processed for 5 to 6 hours. This step hydrolyzes the connective tissue and renders the meat suitable for shredding.
 12. To shred the meat after the 200° F. processing step, the packaged meat is allowed to cool to approximately 170° F. to 190° F. and the packaged meat is manually massaged to shred the meat within.
 13. The packaged meat is then allowed to cool to 40° F. in a cooling or chilling tank containing 40° F. water at which point it may be removed and stored in refrigeration storage at 32° F. to about 40° F.

We claim:

1. A method of preparing a thermally processed meat product suitable for shredding that comprises the steps of:
 a. removing significantly all fat and gristle from the outside of the meat to be subjected to thermal processing
 b. injecting said meat with a solution comprising water and salt wherein the amount of said solution is at least about 5 weight percent to about 18 weight percent based on said meat;
 c. applying means sufficient to distribute said solution within said meat;
 d. forming a roux that comprises a liquid-state fat, selected from the group consisting of animal and vegetable fats, and seasonings;
 e. packaging said meat and said roux in hermetically sealed packaging material, said packaging material sufficient to withstand thermal processing parameters listed below;
 f. thermally processing said packaged meat at temperatures sufficient to cause hydrolysis of a significant amount of connective tissue of said meat and render said meat suitable for shredding, including an initial packaging material thermal-shock treatment step or steps if said packaging material so requires;
 g. chilling said packaged meat.

2. A method of preparing a thermally processed meat product as claimed in claim 1 that further comprises the step of applying sufficient forces to the packaged meat to cause said meat to shred, said force applying step occurring while said meat is at temperatures sufficiently high to cause the meat fibers to separate from one another with minimal fiber breakage.

3. A method of preparing a thermally processed meat product as claimed in claim 1 wherein the meat is beef.

4. A method of preparing a thermally processed meat product as claimed in claim 1 wherein the meat is beef and the hydrolysis processing step (f) is conducted at from about 190° F. to about 212° F.

5. A method as claimed in claim 2 wherein said force applying step is conducted at temperatures from about 150° F. to about 200° F.

6. A method as claimed in claim 5 wherein said temperatures are from about 160° F. to about 190° F.

7. A method as claimed in claim 2 wherein said forces are applied by manual manipulation of the packaged meat.

8. A method as claimed in claim 2 wherein said forces are applied by mechanical manipulation of the packaged meat.

9. A method of preparing a thermally processed meat product as claimed in claim 1 wherein the solution to be injected further comprises a triphosphate.

10. A method of preparing a thermally processed meat product as claimed in claim 9 wherein said triphosphate is sodium tripolyphosphate.

11. A method of preparing a thermally processed meat product suitable for shredding that comprises the steps of:
   a. removing significantly all fat and gristle from the outside of the meat to be subjected to thermal processing
   b. injecting said meat with a solution comprising water and salt wherein the amount of said solution is at least about 5 weight percent to about 18 weight percent based on said meat;
   c. applying means sufficient to distribute said solution within said meat;
   d. forming a roux that comprises a liquid-state fat, selected from the group consisting of animal and vegetable fats, and seasonings;
   e. packaging said meat and said roux in hermetically sealed packaging material, said packaging material sufficient to withstand thermal processing parameters listed below;
   f. thermally processing said packaged meat at temperature sufficient to begin hydrolysis of the connective tissue of said meat, including an initial packaging material thermal-shock tempering step if said packaging material so requires;
   g. further processing said packaged meat at temperature sufficient to cause hydrolysis of a significant amount of said connective material and render said meat suitable for shredding;
   h. chilling said packaged meat.

12. A method of preparing a thermally processed meat product as claimed in claim 11 wherein the meat is beef and processing step (f) is conducted at from about 170° F. to about 190° F.

13. A method of preparing a thermally processed meat product as claimed in claim 1 wherein said solution distributing means (c) is a tumbler.

14. A method of preparing a thermally processed meat product as claimed in claim 1 that further comprises the step of dicing or slicing the meat prior to packaging and after injecting with the solution.

15. A method of preparing a thermally processed meat product as claimed in claim 1 wherein about 10 to about 12 weight percent of solution is injected into said meat, said weight percent based on said meat.

16. A method of preparing a thermally processed meat product as claimed in claim 2 wherein the weight percent of solution injected into said meat is about 10 to about 12 weight percent.

17. A method of preparing a packaged, shredded beef product that comprises the steps of:
   a. removing significantly all fat and gristle from the outside of the beef to be subjected to thermal processing;
   b. injecting the beef with a solution of from about 10 to about 12 weight percent wherein said solution comprises water, salt and a triphosphate;
   c. tumbling the injected beef to distribute said solution;
   d. dicing said beef into cubes at least about 1"×1"×2";
   e. forming a roux that comprises a liquid-state fat, selected from the group consisting of animal and vegetable fats, and seasonings;
   f. packaging said beef and said roux in hermetically sealed packaging material, said packaging material sufficient to withstand beef processing parameters listed below;
   g. processing said packaged beef for approximately one hour at temperatures from about 145° F. to about 155° F. to reduce thermal-shock on said packaging material;
   h. further processing said packaged beef at temperatures from about 175° F. to about 185° F. for time sufficient to raise the internal temperatures of beef to from about 175° F. to about 185° F.;
   i. further processing said packaged beef at temperatures from about 195° F. to about 205° F. for time sufficient to cause hydrolysis of a significant amount of the connective tissues of said beef and render said beef suitable for shredding;
   j. applying forces to the cooked, packaged beef sufficient to cause said beef to shred, said forces applied while said beef is at temperatures from about 170° F. to about 190° F.;
   k. chilling the packaged shredded beef.

18. A method of preparing a thermally processed meat product as claimed in claim 11 wherein processing steps (f) and (g) are performed by immercing the packaged meat in water, wherein said water is heated to step (f) and (g) processing temperatures.

19. A method of preparing a thermally processed meat product as claimed in claim 1 wherein processing step (f) is performed by immercing the packaged meat in water, wherein said water is heated to step (f) processing temperatures.

* * * * *